Patented May 4, 1948

2,441,098

UNITED STATES PATENT OFFICE 2,441,098

METHYL SILOXANE POLYMERS AND METHOD OF PREPARATION

James Franklin Hyde, Corning, N. Y., assignor to Corning Glass Works, Corning, N. Y., a corporation of New York No Drawing. Application September 9, 1946, Serial No. 695,803

4 Claims. (Cl. 260—607)

This invention relates to new compositions of matter, their preparation and uses and, more particularly, to methyl silicon oxides and their preparation.

This application is a continuation-in-part of my copending application Serial Number 503,159, filed September 20, 1943, and assigned to the assignee of the present invention.

Methyl silicon oxides or methyl siloxanes are compositions which contain alternate silicon and oxygen atoms and methyl radicals attached to silicon through a carbon atom. They may be prepared by hydrolysis of a hydrolyzable methyl-substituted silane and condensation of the hydrolysis product or by hydrolysis of a mixture of different hydrolyzable methyl-substituted silanes and inter-condensation of the hydrolysis products. By hydrolyzable methyl-substituted silanes we mean methyl derivatives of $SiH_4$ which contain readily hydrolyzable radicals such as halogens, amino groups, alkoxy, aroxy, acyloxy radicals, etc. Examples of such compounds are methylsilicon trichloride, dimethylsilicon dichloride, trimethylsilicon chloride, methyltriethoxysilane, dimethyldiethoxysilane, trimethylethoxysilane, etc.

The methyl siloxanes hitherto prepared have contained mostly mono- and dimethyl silicon units with some trimethyl silicon units also being present. They were liquids which when heated were readily converted to gels or resinous solids. It is highly desirable for certain purposes, such as high altitude flying, to find a hydraulic fluid which is adapted to function effectively over a wide temperature range and particularly at temperatures well below —40° C. and preferably down to —60° C. Because of their ready condensibility, use of the above-mentioned methyl siloxanes as hydraulic fluids, damping fluids, etc., has been too hazardous for their adoption commercially. A liquid methyl siloxane which is thermally stable and which possesses other properties such as low solidification temperature, low vapor pressure, relatively low viscosity-temperature coefficient and high chemical stability would be extremely useful.

One of the objects of my invention is to provide a method of making thermally-stable liquid methyl silicon oxide copolymers.

Another object of my invention is to provide a method of making thermally stable liquid methyl silicon oxide copolymers which are members of the homologous series

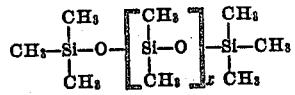

where $x$ is an integer.

Another object of my invention is to provide a method of preparing liquid methyl silicon oxide polymers which have a low solidification temperature, low viscosity-temperature coefficients and which do not set to a gel at elevated temperatures.

The method of the present invention comprises hydrolyzing a mixture consisting of silanes of the formulae $(CH_3)_2Si(OR)_2$ and $(CH_3)_3SiOR$ respectively in the presence of an alkali metal hydroxide where R is an alkyl radical. Of the alkali metal hydroxides, I prefer to employ sodium and potassium hydroxides. The amount of the hydroxide present in the hydrolysis medium must be such that the ratio of number of alkali metal atoms to number of silicon atoms in the mixture of silanes does not exceed 1 to 25. By this method it is possible to insure the maximum production of chain polymers end-blocked with trimethylsilicyl units.

The products prepared in accordance with the above methods consist of the structural units

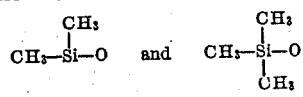

As prepared, by the examples given, they consist of a random mixture of polymers of various chain lengths, the individual members of which belong to the homologous series represented by the formula

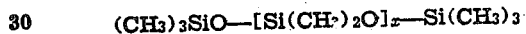

where $x$ is an integer from 1 to infinity. However, owing to the difficulty of obtaining complete hydrolysis and complete condensation there may be present a few remaining unhydrolyzed ethoxy radicals, usually less than 1 for about 100 siloxane linkages, or the like, or some uncondensed hydroxyl groups, usually less than 1 for about 400 siloxane linkages, but not in sufficient amounts to impair the properties of the liquid products.

For many uses, particularly in fluid pressure operated devices, it is preferred to use instead of the above mixtures of copolymers having a range of physical properties, an individual copolymer of the species

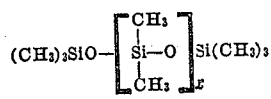

having the definite physical properties of a pure chemical compound. These may be obtained by isolation of the individual members from the hydrolysate of a mixture of $(CH_3)_3SiX$ and $(CH_3)_2SiX_2$ which is prepared in such a manner as to be substantially completely hydrolyzed and free from cyclic polymers of the formula

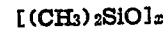

For a better understanding of my invention, reference should be had to the following example.

In a 5 liter three-necked flash, fitted with a reflux condenser, agitator and thermometer, were placed 1393 gms. (9.41 mol) of redistilled (CH₃)₂Si(OEt)₂ and 1110 gms. (9.41 mol) of (CH₃)₃SiOEt. To this solution was added 254 gms. (14.11 mol) of water containing 7.5 gms. of NaOH, (approximately 1 NaOH per 100 silicon atoms). This insured the formation of only straight chain polymers. The mixture was heated to 40° C. and the temperature continued to rise for nearly an hour. After adding 50 cc. (20% excess) more water, the mixture was refluxed for two hours and then allowed to stand overnight.

Alcohol was then distilled off, until the temperature reached 100° C. 1706.6 gms. of distillate was collected. (Theory 1430 gms.) This alcohol was poured into four times its volume of water and an insoluble oil separated (457 gms.). The insoluble fraction was added back to the copolymer residue from the distillation and 555 cc. of 20% hydrochloric acid was added. The acid mixture was refluxed for two hours, and the silicon oils were carefully washed with distilled water until neutral. The yield was 1426 gms. (Theory 1469 gms.)

The oil was distilled in a fractionating column packed with glass helices, first at atmospheric pressure, then at reduced pressure. The fractions from the plateaus in the distillation curve were refractionated and the properties of the pure siloxane polymers were determined. These are shown in the data of Table I, Section A, from which it appears that the individual fractions are members of the series

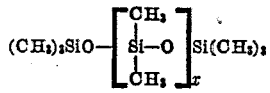

where $x = 0$ to 7 inclusive, that is, the fractions consisted of trimethylsilicyl ether and copolymers of $(CH_3)_3Si-O-$ with

containing from 3 to 9 silicon atoms inclusive. The residue (178 gms.) from the fractional distillation was placed in a Claisen flask and distilled under high vacuum without fractionation. This gave a clear distillate distilling over a range of from 125° to 215° C. at 0.125 mm. Refractionation of this distillate showed it to be composed of members of the above series where X is 8 to 13 inclusive. That is, it consisted of copolymers of $(CH_3)_3Si-O-$ with

containing from 10 to 15 silicon atoms inclusive. The properties of these materials are shown in Table I, Section B; an undistilled residue of 39.1 gms. remained. This was treated with decolorizing carbon and filtered to give the final residue as shown in the following Table I, Section C. Evidently, this residue contained linear copolymers having more than 15 silicon atoms in the molecule.

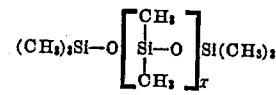

TABLE I
*Physical properties of trimethylsilicyl end blocked dimethyl siloxane polymers*

| | No. of Si Atoms | B. P., ° C. | Absolute Viscosity in Centistokes | | Specific Gravity at 25° C. | Ref. Index at 25° C. | Flash Point, ° F. | Coeff. of Expansion 25° to 100° C.×10⁻³ |
|---|---|---|---|---|---|---|---|---|
| | | | 25° C. | 40° C. | | | | |
| Section A | 2 | 99.5 | 0.65 | 1.76 | .7606 | 1.3748 | 15 | 1.50 |
| | 3 | 152 | 1.04 | 2.97 | .8182 | 1.3822 | 98 | 1.451 |
| | 4 | 192 | 1.53 | 4.99 | .8516 | 1.3872 | 158 | 1.312 |
| | 5 | 115/20 mm | 2.06 | 7.38 | .8710 | 1.3902 | 202 | 1.247 |
| | 6 | 140/20 mm | 2.63 | 9.67 | .8673 | 1.3922 | 245 | 1.206 |
| | 7 | 87/0.5 mm | 3.24 | 12.50 | .9004 | 1.3940 | 272 | 1.154 |
| | 8 | 102/0.5 mm | 3.88 | 16.40 | .9078 | 1.3952 | 292 | 1.136 |
| | 9 | 119/0.5 mm | 4.58 | 19.90 | .9140 | 1.3963 | 318 | 1.110 |
| Section B | 10 | 136/0.5 mm | 5.35 | 23.5 | .9202 | 1.3973 | 350 | 1.078 |
| | 11 | 152/0.5 mm | 6.10 | 28.3 | .9247 | 1.3982 | 371 | 1.055 |
| | 12 | 177/0.5 mm | 6.85 | 33.2 | .9284 | 1.3990 | 389 | 1.034 |
| | 13 | 192/0.5 mm | 7.75 | 38.0 | .9317 | 1.3998 | 406 | 1.016 |
| | 14 | 207/0.5 mm | 8.70 | 44.3 | .9314 | 1.4004 | 422 | .999 |
| | 15 | 222/0.5 mm | 9.65 | 50.5 | .9368 | 1.4010 | 437 | .983 |
| Section C | Residue | | 12.0 | 65.0 | .9454 | 1.4008 | 458 | |

Both the individual copolymers and the copolymer mixtures of my invention are resistant to further polymerization at high temperatures in the presence of air. The table below gives the hours at 200° C. required to cause gelation of different copolymer mixtures of my invention both in the presence and absence of an inhibitor (in the present case, 1% of p-amino-phenol).

TABLE II

| Mol Proportions | | Hours for Gelation at 200° C. in Air | |
|---|---|---|---|
| Di | Tri | Without Inhibitor | With Inhibitor |
| 100 | 0 | 12 | 58 |
| 98 | 2 | 138 | 500 |
| 98 | 5 | 444 | 500 |
| 90 | 10 | 500 | 500 |
| 75 | 25 | 500 | 500 |

In addition to possessing the properties of high termal stability and low solidification temperature, the copolymers of my invention exhibit relatively small change of viscosity with temperature. By way of illustration, liquid copolymers resulting from the hydrolysis of 3 mol equivalents of $(CH_3)_3SiOC_2H_5$ with 97 mol equivalents of $(CH_3)_2Si(OC_2H_5)_2$ were distilled up to 250° C. still temperature under 25 mm. pressure. The residual oil was cooled, filtered and found to have a viscosity of 58 centistokes at 25° C. and a flash point of 385° F. It would not freeze on exposure to temperatures of −50° to −60° C. A comparison of the viscosity of this liquid siloxane with a high grade hydraulic fluid based on a petroleum oil is given in the table below in Saybolt Universal seconds.

TABLE III

| Temp., °F. | Methyl Siloxane Fluid | Petroleum Base Oil (Univis 54) |
|---|---|---|
| 210 | 92 | 51.5 |
| 100 | 220 | 200 |
| 0 | 750 | 6,000 |
| −22 | 1,050 | 19,500 |
| −40 | 1,500 | 65,000 |

It will be seen from the above table that the viscosity change from 100° to 0° F. for the petroleum oil is nearly 11 times that of the methyl siloxane fluid.

The liquid methyl copolymers of my invention are eminently adapted to be used as damping fluids, hydraulic fluids, compass liquids, etc. They are colorless, odorless, and inert physiologically and chemically. They are without corrosive effect on metals and do not swell or deteriorate rubber or synthetic rubber gasketing or tubing material. Liquids of varying intrinsic viscosity may be obtained to suit the individual application. The principal characteristics which adapt these polymeric liquid methyl siloxanes to use in aircraft hydraulic fluids are their low rate of change of viscosity with change of temperature, their low solidification temperature, their inertness to metals, rubber and other construction materials over the temperature range used, and the high flash point and low vapor pressure for a liquid of a given viscosity.

I claim:

1. The method which comprises hydrolyzing a mixture consisting of silanes of the general formulae $(CH_3)_2Si(OR)_2$ and $(CH_3)_3SiOR$ where R is an alkyl radical, which mixture contains at least one mol of the former per two mols of the latter, by reacting the mixture with water in amount in excess of that theoretically required to effect complete hydrolysis, said hydrolysis being carried out in the presence of an alkali metal hydroxide in such amount that the ratio of number of alkali metal atoms to the number of silicon atoms in the mixture does not exceed 1 to 25, and condensing the methyl silicon hydrolysis product by dehydration.

2. The method which comprises hydrolyzing a mixture consisting of dimethyldiethoxysilane and trimethylethoxysilane, which mixture contains at least one mol of the former per two mols of the latter, by reacting the mixture with water in amount in excess of that theoretically required to effect complete hydrolysis, in the presence of an alkali metal hydroxide in such amount that the ratio of number of alkali metal atoms to the number of silicon atoms in the mixture does not exceed 1 to 25, and condensing the methyl silicon hydrolysis product by dehydration.

3. The method which comprises hydrolyzing a mixture consisting of dimethyldiethoxysilane and trimethylethoxysilane, which mixture contains at least one mol of the former per two mols of the latter, by reacting the mixture with water in amount in excess of that theoretically required to effect complete hydrolysis, in the presence of sodium hydroxide in such amount that the ratio of number of sodium atoms to number of silicon atoms does not exceed 1 to 25, and condensing the methyl silicon hydrolysis product by dehydration.

4. The method which comprises heating a mixture consisting of dimethyldiethoxysilane and trimethylethoxysilane, which mixture contains at least one mol of the former per two mols of the latter, in the presence of aqueous sodium hydroxide, the amount of water present being in excess of that theoretically required to effect complete hydrolysis and the amount of sodium hydroxide being such that the ratio of number of sodium atoms to number of silicon atoms does not exceed 1 to 25, and recovering the methyl silicon hydrolysis products, refluxing the methyl silicon hydrolysis products in the presence of aqueous hydrochloric acid, thereafter washing the product until neutral, and again recovering the methyl silicon hydrolysis products.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,386,441 | Daudt | Oct. 9, 1945 |